United States Patent [19]

Spach et al.

[11] 4,247,356

[45] Jan. 27, 1981

[54] EXPANDABLE TIRE BUILDING DRUM WITH IMPROVED BLADDER

[75] Inventors: Richard N. Spach, Louisville; Steve J. Kovalchik, Jr., Akron, both of Ohio

[73] Assignee: The General Tire & Rubber Co., Akron, Ohio

[21] Appl. No.: 951,901

[22] Filed: Oct. 16, 1978

[51] Int. Cl.³ .......................................... B29H 17/16
[52] U.S. Cl. .................................... 156/416; 156/417
[58] Field of Search ............. 156/394 R, 401, 414, 156/415, 416, 417, 418, 419, 420; 92/89–93

[56] References Cited

U.S. PATENT DOCUMENTS

| | | | |
|---|---|---|---|
| 3,134,079 | 5/1964 | Giletta et al. | 156/415 |
| 3,171,769 | 3/1965 | Henley et al. | 156/401 |
| 3,434,897 | 3/1969 | Caretta et al. | 156/416 |
| 3,475,254 | 10/1969 | Henley | 156/401 |
| 4,057,454 | 11/1977 | Smith et al. | 156/401 |
| 4,060,445 | 11/1977 | Houck et al. | 156/414 |
| 4,081,310 | 3/1978 | Shickman et al. | 156/398 |
| 4,087,305 | 5/1978 | Touchette et al. | 156/414 |

Primary Examiner—John E. Kittle

[57] ABSTRACT

An expandable tire building drum has an improved bladder for expanding and contracting the drum segments. Instead of being a closed torus with a radially inwardly extending inflation stem, the bladder is completely open on its radially inward side and has beads that are clamped in an airtight seal to the bladder support. The bladder in its deflated condition rests in three folded layers within its storage cavity in the drum. This bladder construction allows a bladder having a relatively large surface area to be stored in a relatively small cavity. The space in the cavity for storing such bladders is often limited, particularly in drums for building radial passenger car tires. Putting a larger bladder in this cavity than allowed by prior constructions results in a greater surface contact between the bladder and the drum segments when the bladder is inflated. This enables the drum to be expanded using lower bladder pressures, which means the bladder walls do not have to be as strong and they will not wear out as fast. Also, small air leaks in the bladder inflation system will not be as critical.

3 Claims, 3 Drawing Figures

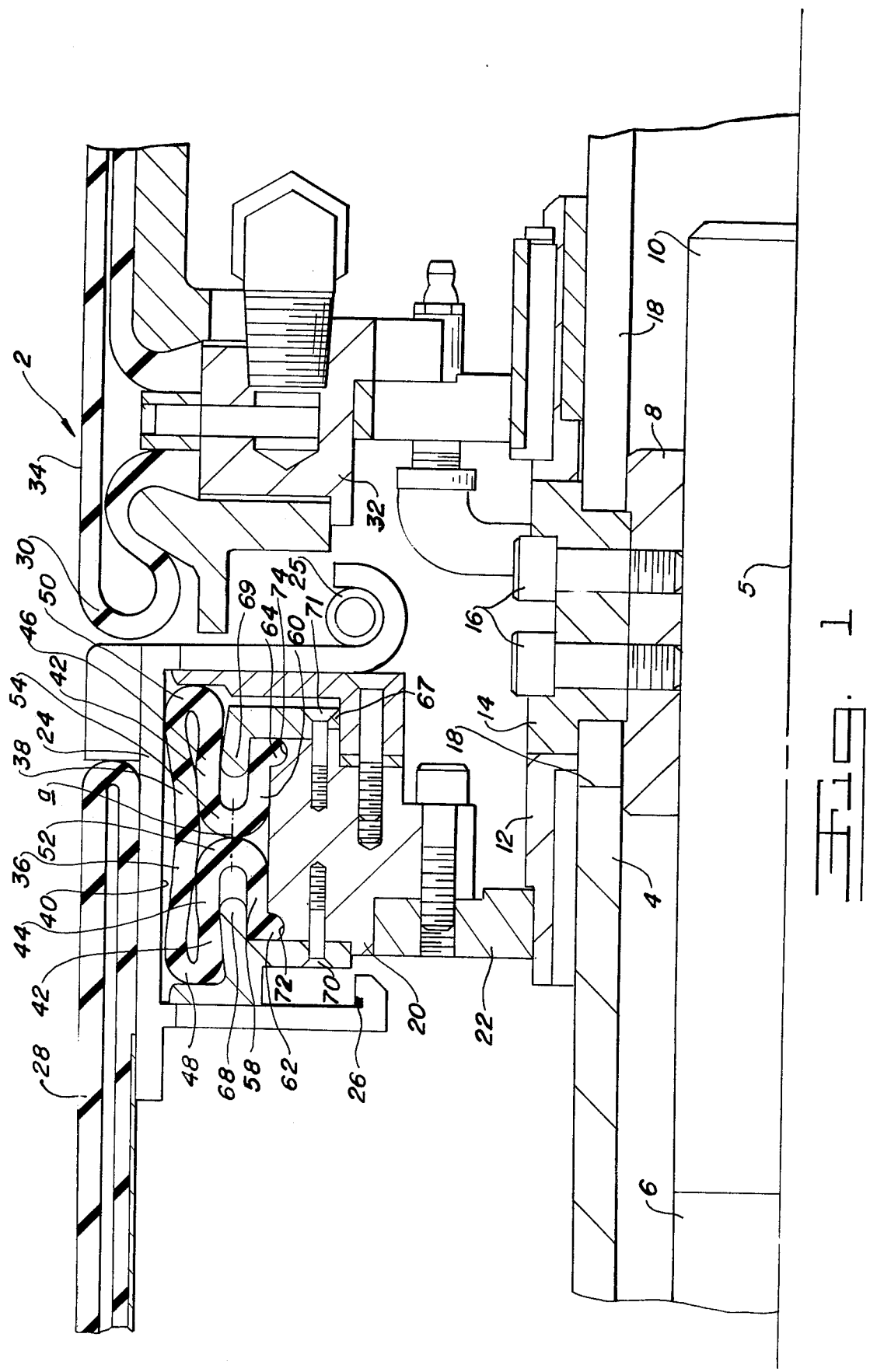

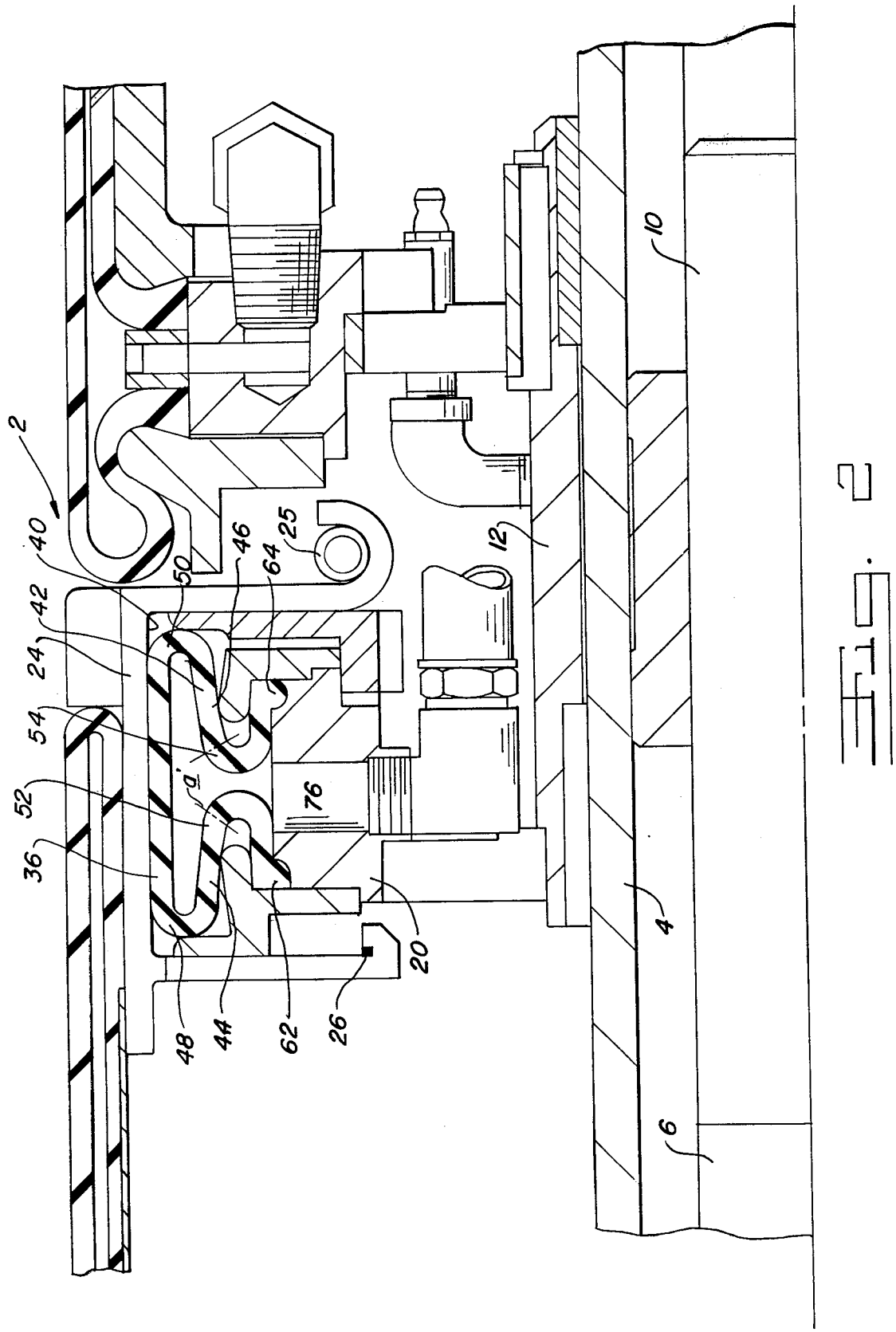

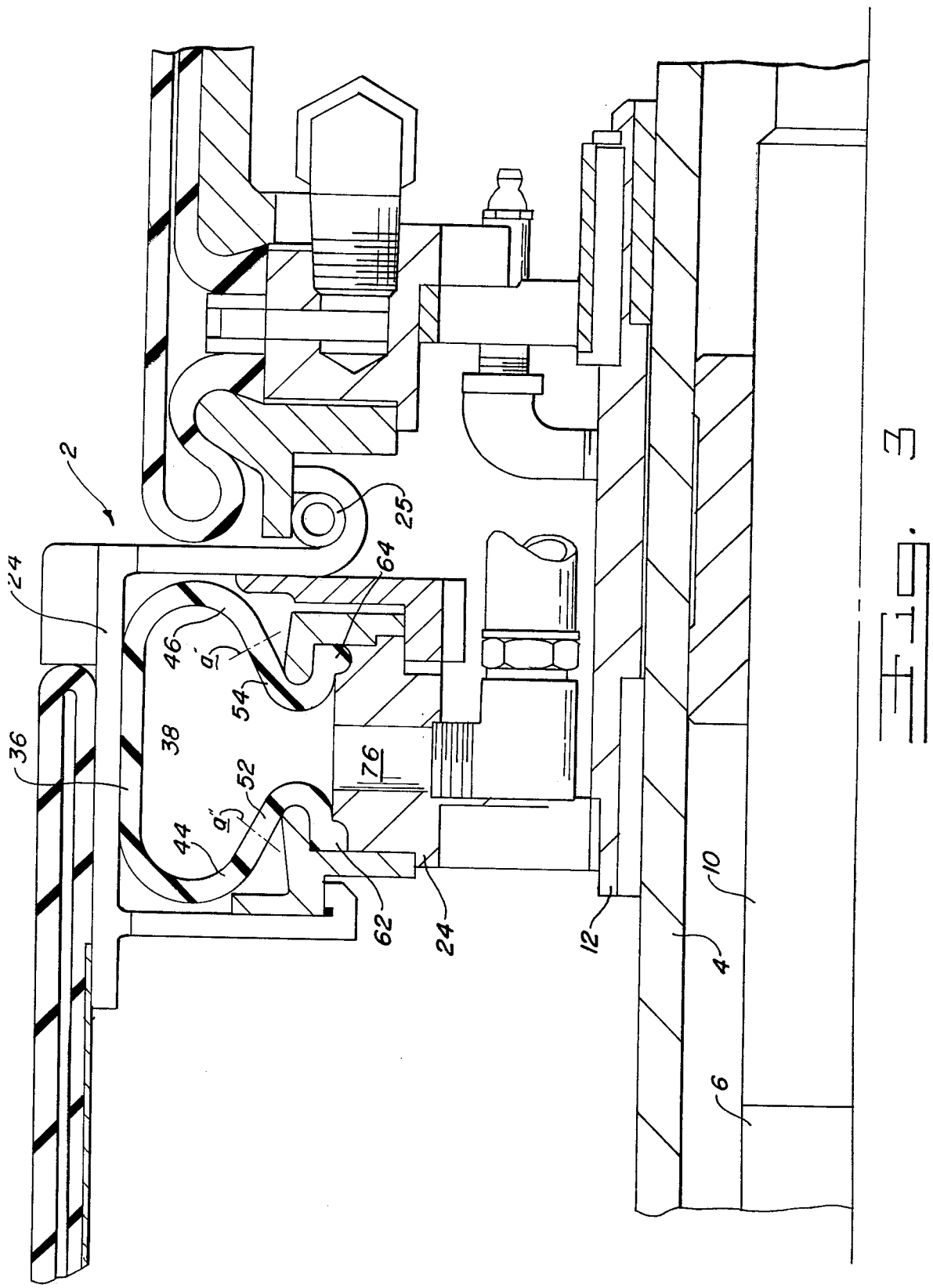

EXPANDABLE TIRE BUILDING DRUM WITH IMPROVED BLADDER

FIELD OF THE INVENTION

This invention relates to an expandable tire building drum. More particularly, the invention relates to an improved bladder for expanding and retracting the segments of the drum.

BACKGROUND OF THE INVENTION

In each of the expandable tire building machines shown in U. S. Pat. Nos. 3,171,769 to Henley et al. and 3,475,254 to Henley, the building drum is made of radially movable segments, numbered 59 in the '769 patent and 116 in the '254 patent. These segments are movable radially outwardly and inwardly to change the diameter of the drum. This allows the carcass plies to be wrapped around the drum with the main body of the drum at approximately the same diameter as the turnover bladders. Then the drum can be expanded to allow the beads to be set adjacent the ends of the drum and above the turnover bladders, as shown in FIGS. 9 and 10 of the '769 patent. To move the expandable drum segments radially outwardly, there are inflatable bladders provided beneath the drum segments, these bladders being identified by the numeral 58 in the '769 patent and the numeral 111 in the '254 patent. Both of these bladders have torus-shaped configurations and radially inwardly facing stems through which air is introduced to inflate the bladders, as shown in FIG. 6 of the '769 patent and FIG. 9 of the '254 patent.

One problem with torus-shaped bladders such as those shown in the foregoing patents is that, as such bladders expand after their initial contact with the drum segments, their area of contact with the drum segments diminishes. This is because such a bladder expands simply by its initially cylindrical walls stretching into arcuate bulges. As the outer wall of the bladder bulges, it becomes rounder, with less and less of its area in contact with the drum segments it presses against. As this area of contact decreases, the bladder exerts less and less force against the drum segments in proportion to the pressure in the bladder. This condition, added to the drum segments being biased radially inwardly by springs, results in the need for a very high bladder pressure to push the drum segments radially outwardly and to hold them in their radially outward positions. The bladder pressure must be sufficient to withstand the opposing forces of the carcass ply turnover bladders as they roll over the side portions of the expanded drum, and the opposing forces of the stitcher wheels as they roll over the drum to stitch the carcass ply ends to the main body of the carcass. The requirement for such a high bladder pressure means that the bladder walls must endure great stresses and are subject to great fatigue. Also, even small air leaks in the bladder inflation system become critical, resulting in frequent failures of the drum to expand properly and to remain in its expanded condition when the carcass ply ends are being secured around the bead rings.

The foregoing problems might be alleviated in some cases by using larger bladders that initially have a larger surface contact area with the drum segments. With such larger bladders, the loss in contact area upon full inflation of the bladder would not be as critical. However, in many cases there is not enough space along the length of the drum to use a larger bladder. This is particularly true with drums for building radial tires such as that shown in the '254 Henley patent referred to above. With such a radial tube building drum, the side portions of the drum must be capable of being moved axially together when the carcass is expanded to its toroidal shape, as shown in FIG. 30 of that patent. This seriously limits the space for containing the bladders that push against the drum segments to expand the drum, and thus, larger bladders of the conventional construction are not feasible.

SUMMARY OF THE INVENTION

The present invention resides in an expandible tire building drum having drum expanding bladders of an improved construction that causes the bladder to retain a larger contact area with the drum segments upon expansion. Yet, when deflated, the bladder fits into a storage cavity in the drum that is no larger than a bladder having considerably smaller drum segment contact area on expansion.

Specifically, the improvement of the invention comprises an annular bladder that when deflated is folded upon itself in three layers. The radially outermost of these layers lies beneath the underside surfaces of the drum segments. The intermediate of the three bladder layers includes two intermediate bladder portions, each having a first edge merging with the opposite lateral edges of the outermost layer. These intermediate bladder portions extend from their first edges toward each other, and have second edges that face each other. The radially innermost of the bladder layers includes two inner bladder portions each merging with one of the second edges of the intermediate bladder portions. These inner bladder portions extend from the second edges of the intermediate bladder portions away from each other and terminate in axially spaced edge portions of the bladder. Preferably, these edge portions of the bladder are in the form of rounded beads.

The building drum includes a bladder support that has axially spaced portions to which the edge portions of the bladder are secured. Preferably, these axially spaced portions are machined to conform to the rounded beads of the bladder. In the bladder support is a passageway that opens into the bladder at a location between the axially spaced portions of the bladder support. This passageway conveys air or another inflating medium to the bladder. Two bladder clamp rings are secured to the bladder support. Each of these bladder clamp rings clamps one of the edge portions of the bladder to the axially spaced portions of said bladder support, forming an airtight seal between the bladder and the bladder support.

Due to open construction of the bladder on its radially inward side, the passageway that conveys the inflating medium to the bladder opens directly into the bladder without the need for a hollow stem protruding from the bladder. This also eliminates the need for O-rings and O-ring grooves that are normally required for making an air-tight connection of the stem to the passageway in the bladder support. When these O-rings wear out, they become an aggravating source of air leaks.

The foregoing features, advantages and objects of the present invention will be more apparent from the following description of a preferred embodiment of the invention and the attached drawings.

DESCRIPTION OF THE DRAWINGS

FIG. 1 is a partial longitudinal section of an expandable drum for building radial tires, illustrating one embodiment of the present invention and showing one of the bladders for expanding the drum in its deflated condition;

FIG. 2 is a partial longitudinal section of the same portion of the same expandable drum as shown in FIG. 1, but taken on a different circumferential position on the drum so as to show one of the passageways for inflating the bladder, and showing the bladder in a partially inflated condition in which it is first engaging the drum segments for the purpose of pushing the segments radially outwardly; and FIG. 3 is a partial longitudinal section of the same portion of the same expandable drum as shown in FIGS. 1 and 2, and taken at the same circumferential position as the section of FIG. 2, but with the bladder for expanding the drum in a fully inflated condition and with the drum segments pushed radially outwardly.

DESCRIPTION OF A PREFERRED EMBODIMENT

Referring to FIG. 1, a section of the top righthand portion of a building drum 2 includes a tubular drum shaft 4 and a cylindrical shaft 6 with the tubular shaft 4. Both the shaft 4 and 6 are rotatable about axis 5 of the drum 2. A threaded sleeve 8 meshes with a threaded portion 10 on cylindrical shaft 6. Also, a sleeve 12 slides on the outside of tubular shaft 4 and insert 14 and bolts 16 extending through slot 18 in shaft 4 connect the sleeve 12 to threaded sleeve 8.

A bladder support 20 is mounted on the sleeve 12 by means of connecting ring 22. When the threaded cylindrical shaft 6 is rotated relative to the tubular shaft 4, the bladder support 20, constrained against rotation by insert 14 in slot 18 of shaft 4, moves axially of the drum 2 on threaded sleeve 8. Another bladder support similar to bladder support 20 but not shown in the drawings is mounted on the left-hand end of the drum 2, but with an oppositely wound threaded connection to shaft 6. Thus, when the shaft 6 rotates relative to the shaft 4, the two bladder supports of the drum 2 move toward or away from each other, to shorten or lengthen, respectively, the distance between the ends of drum 2. The bladder support 20 is shown in FIGS. 1, 2, and 3 in its axially extended position. For its axially closed positions, the bladder support 20 would be moved to the left until it was immediately adjacent the centrally located support spoke 22 of the drum 2. Mounted radially outward of the bladder support 20 are a plurality of drum segments 24 that are disposed around the circumference of the drum 2. The drum segments 24 are slidable inwardly and outwardly with respect to the axis 5 of the drum 2, in order to change the diameter of the drum 2 during the process of building of a tire on the drum. The movable drum segments are normally held in the retracted position shown in FIG. 1 by a hoop-shaped tension spring element 25 on their outboard side and an elastic hoop 26 on their inboard side. Similar drum segments, not shown, are mounted on the left-hand side of the drum 2 and each of these drum segments is connected to a corresponding right-hand side segment 20 by a gap shield 27. On top of the gap shield 27 and the drum segments there is an inflatable bladder 28, used to expand the carcass into a toroidal shape after the bead portions of the tire have been formed.

An inflatable turnover bladder 30 is mounted at either end of the drum 2 on a turnover bladder support 32, which like the bladder support 20, is connected to the sleeve 12 on tubular shaft 4. When deflated, the turnover bladder 30 has a top surface 34 that is of almost the same diameter as that of drum 2, when the drum 2 is in its smallest diameter position shown in FIG. 1.

The foregoing structure of the drum 2 is substantially the same as that shown in the previously mentioned U.S. Pat. No. 3,475,254 to V. E. Henley.

The present invention resides in the structure of bladder 36, designed to push the drum segments 24 outwardly, and in the associated means for mounting and inflating the bladder 36. When deflated, as shown in FIG. 1, the bladder 36 is folded in three layers.

The radially outermost layer 38 lies beneath the underside surface 40 of drum segments 24.

The intermediate layer 42 has portions 44 and 46 that have first edges 48 and 50 that merge with the opposite lateral edges of the outermost layer 42. The intermediate bladder portions 44 and 46 extend from their respective first edges 48 and 50 toward each other and have second edges 52 and 54 facing each other.

The radially innermost bladder layer 56 has two innermost portions 58 and 60 that merge respectively with the second edges 52 and 54 of the intermediate bladder portions. These innermost bladder portions 58 and 60 extend from the second edges 52 and 54 away from each other and terminate in axially spaced bladder edge portions that are preferably in the form of rounded beads 62 and 64.

On each side of the bladder support 20 are bladder clamp rings 66 and 67 with flanges 68 and 69 extending over the ends of innermost bladder portions 58 and 60 and beads 62 and 64. The bladder clamp rings 66 and 67 are held firmly against the sides of bladder support 20 by screws 70 and 71, thus squeezing the beads 62 and 64 of the bladder between flanges 68 and 69 and grooves 72 and 74 in the bladder support 20. Preferably, the grooves 72 and 74 are machined and conform to the shape of the rounded beads 62 and 64 which seat in them. This structure provides a substantially air-tight seal between the heads of the bladder 36 and the bladder support 20.

The bladder 36 is inflated with air that is introduced through a plurality of passageways disposed about the circumference of bladder support 36, such as the passageway 76 shown in FIG. 2. The passageway 76 opens into the inside bladder 36 at orifice 78, located between the machined grooves 72 and 74 in which the bladder beads 62 and 64 are seated.

When pressurized air is introduced into the bladder 36 through passage 76, the air pushes apart the second edges 52 and 54 of the intermediate bladder portions 44 and 46, as shown in FIG. 2. This allows the pressurized air to flow into the main part of the bladder 36 that is between the intermediate bladder layer 42 and the outermost bladder layer 38. This results in the bladder 36 expanding so that its outermost layer 38 contacts the underside surface 40 of the drum segments 24 as shown in FIG. 2. In this process, the sections of the bladder that are initially touching, indicated by chain line a in FIG. 1 separate and move to the positions indicated by chain lines $a^1$ in FIG. 2. The result of this action is that the intermediate bladder portions 44 and 46 move laterally away from each other and force their first edges 48 and 50 radially outwardly. The opposite lateral edges of the outermost bladder layer 38 are thus moved radially outwardly, and virtually the entire top surface of the bladder layer 38 is lifted into contact with the underside surface 40 of the drum segments 24, as FIG. 2 illustrates.

After the bladder 38 reaches the position shown in FIG. 2, it continues to inflate, causing the drum segments 24 to be pushed outwardly against the inward constraining forces of the spring 25 and elastic band 26. Finally, the bladder 38 becomes fully inflated and the drum segments 24 are pushed to their outermost positions, as illustrated in FIG. 3. In its fully inflated position, the bladder 36 continues to have most of its outermost layer 38 in engagement with the underside surfaces 40 of the drum segments 24. This wide area of engagement is made possible by the sections of the bladder 36 indicated by the chain lines a in FIG. 1 and $a^1$ in FIG. 2 continuing to move apart to positions indicated by chain lines $a^{11}$ in FIG. 3. This movement causes the intermediate bladder portions 44 and 46 to move further away from each other and radially outwardly, thus applying an outward force on the lateral edge of the outermost bladder layer 38. This outward force tends to keep a great portion of the outermost layer 38 in contact with the underside surfaces 40 of the drum segments 24. This contact area obtained by bladders of conventional construction, because the sections of such conventional bladders adjacent their air inlet stems, which correspond to the sections of chain lines a, $a^1$, of the bladder 36, must remain in fixed positions tied to the air inlet stems.

As shown in FIGS. 1, 2, and 3, these sections of bladder 36 move apart from the positions a in FIG. 1 to the positions $a^1$ in FIG. 2, to the positions $a^{11}$ in FIG. 3. This is the movement that forces the outermost layers 36 of the bladder into a greater area of engagement with the drum segments 24. With this greater engagement area, of course, less air pressure is required in the bladder 36 to maintain the required outward force on the drum segments 24.

Thus, the bladder 36 provides a drum expansion means that exerts the required force on the drum segments in their expanded position with less pressure in the bladder. This results in lower stresses and fatigue on the bladder, and consequently, longer bladder life than with previous bladder structures. Since the bladder is not in the form of a closed torus, it can be molded on a flat drum at less expense. No inflation stems are required, which further reduces the expense of making the bladder, and also eliminates the inflation stem O-ring seals which have previously been a source of air leaks.

The foregoing advantages and features of the present invention may, of course, be obtained by other embodiments and modifications occurring to those skilled in the art, while remaining within the scope of the appended claims.

We claim:

1. An expandable tire building drum having a hub, a plurality of drum segments connect to said hub and movable radially outwardly and radially inwardly to expand and contract respectively the diameter of said drum at least one bladder support mounted on said hub, and an annular bladder mounted on said bladder support and positioned immediately beneath said drum segments, said bladder support having a passageway for conveying an inflating medium to said bladder, said annular bladder being inflatable move said drum segments radially outwardly and deflatable to allow said drum segments to move radially inwardly, wherein the improvement comprises:
   (a) annular bladder when deflated being folded upon itself in three layers,
     (1) the radially outermost of said layers lying beneath the underside surfaces of said drum segments,
     (2) the intermediate of said three layers including two intermediate bladder portions each having a first edge merging with the opposite lateral edges of said outermost layer, said intermediate bladder portions extending from said first edges toward each other and having second edges that face each other, and
     (3) the radially innermost of said layers including two innermost bladder portions each merging with one of said second edges of said intermediate bladder portions, said innermost bladder portions extending from said second edges of said intermediate bladder portions away from each other and terminating in axially spaced edge portions of said bladder;
   (b) said bladder support having axially spaced portions to which said edge portions of said bladder are secured, said passageway that conveys said inflating medium opening into said bladder at a location between said axially spaced portions of said bladder support; and
   (c) two bladder clamp rings secured to said bladder support, each of said bladder clamp rings clamping one of said edge portions of said bladder to said axially spaced portions of said bladder support.

2. The tire building drum of claim 1 wherein said edge portions of said bladder are rounded beads, and said axially spaced portions of said bladder support are machined to conform to the shape of said rounded beads to provide air-tight seals with said beads.

3. The tire building drum of claim 1 wherein said axially inward fold portions in which said intermediate bladder portions terminate are engaging each other when said bladder is deflated.

* * * * *

UNITED STATES PATENT AND TRADEMARK OFFICE
CERTIFICATE OF CORRECTION

PATENT NO. : 4,247,356
DATED : January 27, 1981
INVENTOR(S) : Richard N. Spach et al.

It is certified that error appears in the above-identified patent and that said Letters Patent are hereby corrected as shown below:

Column 6, line 5 :  replace "connect" with ---connected---.

Column 6, line 13:  after "inflatable" insert ---to---.

Column 6, line 17:  after "(a)" and before "annular" insert ---said---.

Signed and Sealed this

Twenty-first Day of April 1981

[SEAL]

Attest:

RENE D. TEGTMEYER

Attesting Officer    Acting Commissioner of Patents and Trademarks